Dec. 11, 1962 M. J. CORBETT 3,067,575
DISPOSABLE ROCKET MOTOR
Filed Jan. 2, 1959

Inventor
Marshall J. Corbett
by Hill, Sherman, Meroni, Gross & Simpson Attys

United States Patent Office 3,067,575
Patented Dec. 11, 1962

3,067,575
DISPOSABLE ROCKET MOTOR
Marshall J. Corbett, Cleveland, Ohio, assignor to Thompson Ramo Wooldridge Inc., Cleveland, Ohio, a corporation of Ohio
Filed Jan. 2, 1959, Ser. No. 784,798
10 Claims. (Cl. 60—35.6)

This invention relates to a disposable rocket motor. More particularly, this invention relates to a rocket motor adapted to burn a gelatinous mono-propellant fuel in such a fashion that the fuel tank in which the fuel is stored may be burned or otherwise decomposed by the exhaust gases discharged from a slidably mounted combustion chamber and nozzle so that the weight of the rocket is continually reduced as the fuel and the fuel tank are burned during the course of the flight of the rocket.

It is a feature of the present invention to provide a fuel tank which may be of generally cylindrical cross-section and which is adapted to preferably contain a gelatinous mono-propellant fuel which has flow and consistency characteristics such that it is normally extruded into a combustion chamber. It has previously been the practice to provide plunger or other drive means in the fuel tanks of rockets of this type in order to force or extrude such fuels into a combustion chamber fixed in position with respect to the fuel tank. In such a rocket, of course, the total weight of the rocket structure itself (exclusive of the fuel) remains constant during the flight of the rocket.

It is a feature of the present invention to provide such a fuel tank having mounted in the discharge end thereof a combustion chamber and nozzle assembly which is slidably positioned so that it may be drawn, pulled, or otherwise moved into the fuel tank thereby forcing or extruding the gelatinous fuel in the tank into the combustion chamber. Although this feeding technique could, of course, be used in conjunction with a fuel tank so shaped that it will form a continuation of the discharge nozzle as the combustion chamber and nozzle are drawn into the tank, it is preferred to construct the fuel tank of a material such as a plastic or metal which, although strong enough to retain the fuel therein, is of such a character that it will be burned or otherwise decomposed by the exhaust gases discharged from the nozzle as the fuel is burned in the combustion chamber. This progressive burning away of the rearward portion of the fuel tank after the fuel contained originally therein has been consumed in the combustion chamber materially reduces the remaining weight of the rocket engine structure thereby increasing the efficiency of the engine as the flight progresses.

It is therefore an object of this invention to provide a disposable rocket motor in which a fuel tank is itself burned or decomposed during the operation of the motor in order to progressively reduce the weight of the structure.

It is a further object of this invention to provide a gelatinous mono-propellant fueled rocket engine in which a combustion chamber and nozzle are slidably mounted in a fuel tank so as to be moved into the fuel tank to extrude fuel into the combustion chamber, the arrangement being such that the fuel tank is progressively burned or decomposed by gases discharged from the moving nozzle.

It is a further object of this invention to provide a disposable rocket motor the total weight of the structure of which is decreased during the operation of the motor in order to improve the efficiency thereof.

Other objects, features, and advantages of the present invention will be more fully apparent to those skilled in the art from the following detailed description taken in connection with the accompanying drawings in which like reference characters refer to like parts throughout and wherein.

Figure 1:
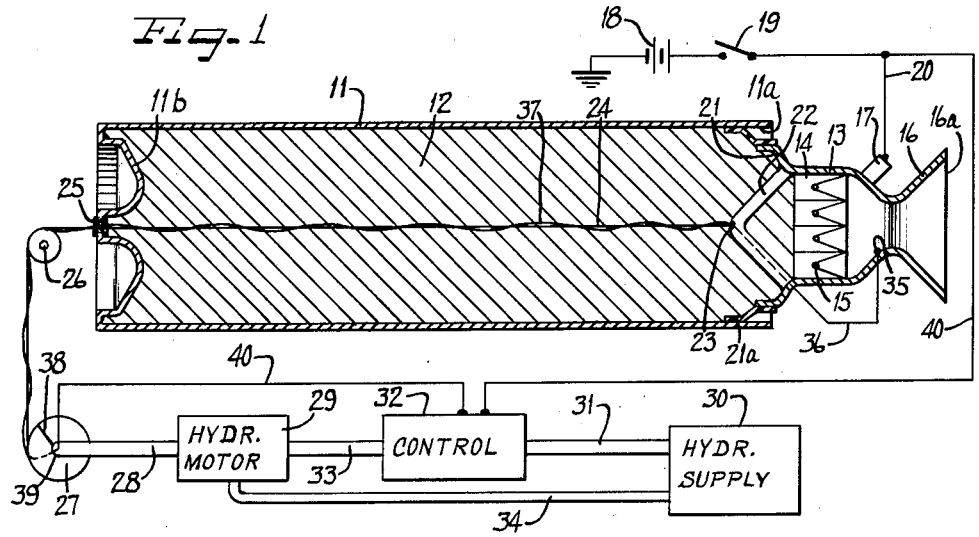
FIGURE 1 is a cross-sectional view, partly diagrammatic, showing the disposable rocket engine with the parts in the position existing prior to ignition thereof.

Turning now to the drawing, there is shown in FIGURE 1 a rocket engine comprising a fuel tank 11 adapted to contain a fuel 12 which, by way of example, may preferably be a gelatinous mono-propellant fuel. Suitable gelatin mono-propellants have recently been developed which combine many of the advantages and eliminate many of the disadvantages of both solid and liquid propellants. Such gelatin mono-propellant fuels are extrudible plastic viscous slurries or gelatinous materials. Numerous suitable mono-propellant mixtures can be made into this form. Such mixtures preferably comprise a stable dispersion of a finely divided insoluble solid oxidizer in a continuous matrix of an oxidizable liquid fuel. The liquid fuel can be any oxidizable liquid, preferably an organic liquid containing carbon and hydrogen. Such liquid fuels include hydrocarbons such as triethyl benzine, dodecane and the like; compounds containing oxygen linked to a carbon atom such as esters including methyl maleate, diethyl phthalate, butyl oxalate, and the like; alcohols such a benzyl alcohol, triethylene glycol and the like; ethers such as methyl o-naphthyl ether and the like, and many others.

The solid oxidizer can be any suitable active oxidizing agent which yields an oxidizing element such as oxygen, chlorine, or fluorine readily for combustion of the fuel and which is insoluble in the liquid fuel vehicle. Such oxidizers include inorganic oxidizing salts such as ammonia, sodium and potassium per chlorate or nitrate and metal peroxides such as barium peroxide.

Finely divided solid metal powders, such as aluminum or magnesium, may be incorporated in the mono-propellant composition as an additional fuel component along with the liquid fuel. Such metal powders possess the advantages both of increasing the fuel density and improving the specific impulse of the mono-propellant because of their high heats of combustion.

Gelling agents for imparting desired cohesiveness and flow characteristics to the plastic mixture include natural and synthetic polymers such as polyvinyl chloride, polyvinyl acetate, cellulose esters such as cellulose acetate, cellulose ethers such as ethyl cellulose, metal salts of higher fatty acids such as the sodium or magnesium stearates and palmitates.

The amount of oxidizer is preferably at a stoichiometric level with respect to the liquid fuel, although minimum concentrations of solid oxidizer as low as 40% by weight are operative. In general, the oxidizer will constitute about 65% by weight of the mixture. A preferred operative gelatinous mono-propellant includes a gel composed of up to 50% by weight of a liquid fuel, from 40% to 65% by weight of an oxidizer and from 3% to 10% of a gelling agent. A specific operative fuel can be composed of about 50% by weight of solid oxidizers such as potassium per chlorate, about 45% by weight of liquid fuels such as triethyl benzine, and about 5% by weight of a gelling agent such as ethyl cellulose. It is to be understood, however, that this invention is not limited to use with any particular fuel or in fact to any particular gelatinous mono-propellant mixture, but rather is directed to a disposable rocket engine which may be used with any suitable fuel of which the foregoing examples are illustrative only.

As noted above, the fuel 12 is contained in a fuel tank 11 which is preferably of generally cylindrical shape and is open at its rearward end 11a. Fuel tank 11 is preferably composed of light weight readily combustible metals such as magnesium or aluminum. A combustion chamber 13 has a plurality of nested burner tubes 14 therein, each of which preferably contains a centrally disposed fuel splitting device 15 which may for example be a wire extending across the tube 14 or a conical plug mounted on a spider in the tube. The purpose of the fuel splitter, as is known in the art, is to divide the slug of fuel coming into the burner tube so as to increase the exposed area thereof to increase the burning rate of the fuel.

The combustion chamber 14 has integrally or removably attached thereto a nozzle 16 which extends rearwardly from the combustion chamber. The nozzle 16 is positioned to receive and discharge the gases generated in the combustion chamber 13 by the burning of the fuel 12 therein. It will be noted that the nozzle 16 is preferably of substantially conical shape and that its maximum outer diameter is less than the minimum inner diameter of the cylindrical fuel tank 11.

An igniter 17 which may be of any conventional type such as the electrically actuated squib or hot wire type, is provided to initially ignite the fuel supplied to the combustion chamber. An electrical signal to actuate the igniter 17 may be applied through a circuit including a battery 18, one side of which is grounded as is one side of the igniter 17, and a switch 19 connecting the battery 18 to the igniter 17 through a lead wire 20.

The assembly comprising the combustion chamber 14 and nozzle 16 is slidably mounted in the fuel tank 11 by any suitable means such as an annular flange 21 which projects outwardly and inwardly from the forward periphery of the combustion chamber 14 and which terminates in a flexible lip member 21a is preferably formed of an elastomeric material such as "Teflon" or any other resilient synthetic plastic and is positioned and shaped as shown to accommodate tension on the fuel tank as the combustion chamber is moved. In a rocket using a gelatinous extrudable fuel this tension may readily be absorbed by such a flexible lip since it is not necessary to provide a tight seal to prevent leakage of such fuels as is the case in rockets using liquid fuels.

The flange member 21 may conveniently be reinforced by a spider arrangement 22, the arms of which span the open forward annular end of the combustion chamber 14 and meet at a central point 23 to which a cable 24 may conveniently be attached to move or pull the combustion chamber and nozzle assembly into the fuel tank.

The cable 24 preferably extends axially through the center of the fuel tank 11 and may conveniently enter the fuel tank through a sealed opening 25 in the forward wall 11b of the fuel tank. It will be noted that the forward wall 11b is shaped to have generally a cross-sectional shape on its inner surface which is complementary to the cross-sectional shape of the inner surface of the mounted combustion chamber assembly so that the latter assembly may be pulled up snugly against the front wall of the fuel tank 11 at the end of its travel. The sealing means used for the opening 25 may be a rubber or plastic gasket or O-ring or any other suitable type of sealing means.

The cable 25 is preferably trained over a pulley 26 which may be externally mounted in the missile or other vehicle to be driven by the rocket motor. From pulley 26 the cable 25 extends to a winch 27 which may be driven through any suitable mechanical coupling 28 actuated by a hydraulic motor 29. The pressurized hydraulic fluid required to drive the hydraulic motor 29 may be derived from any convenient source 30 of hydraulic fluid such as an auxiliary power unit or the missile's main hydraulic fluid supply. The hydraulic fluid from source 30 is supplied through a conduit 31 to a control unit 32 in order to control the pressure of the hydraulic fluid supplied from control unit 32 through a conduit 33 to the hydraulic motor 29. Hydraulic fluid discharged from motor 29 may be returned to the hydraulic supply 30 through a conduit 34.

It is known in the art that the thrust developed by a gelatinous mono-propellant fueled rocket is proportional to the combustion chamber pressure which in turn is proportional to the fuel burning rate. With the type of burner tube and flow divider structure illustrated in FIGURE 1, this fuel burning rate is in turn determined by the rate at which fuel is extruded into the combustion chamber. In accordance with the present invention, this extrusion rate, which ultimately controls the thrust developed, is itself controlled by the rate at which the combustion chamber and nozzle assembly are moved into the fuel tank by the winch 27 drawing up the cable 24. In order to control the rate at which the combustion chamber is pulled into the fuel tank and hence to control the thrust developed, any convenient transducer 35 may be provided in the combustion chamber 13 to produce an electrical signal having a characteristic which is a measure of the combustion chamber pressure. The signal produced by transducer 35 is conveniently carried by a wire or electrical cable 36 which is preferably connected from transducer 35 through a sealed opening in the combustion chamber, thence around the outside of the combustion chamber and into another sealed opening to be mounted through one arm of the spider support 22 and thence carried along or wound integrally with the cable 24 which is connected to mechanically move the combustion chamber. Cable 24 as will be recalled, is primarily a cable intended for mechanical actuation of the combustion chamber but may conveniently be provided with one portion 37 which is a part of the electrical control circuit and which is either wound around or integrally with the mechanical cable 24 to that the electrical conductor 37 and the cable 24 move together. Conductor 37 is, of course, connected at one end to the conductor 36 to transmit the electrical signal from transducer 35. Conductor 37 extends with the cable 24 over pulley 26 and around winch 27. The cable 24 may conveniently have a portion 38 which is rigidly attached to a fixed point on the drum of the winch 27. This portion 38 will, of course, also include the continuation of the electrical line 37 which may conveniently be brought in to the center of the winch 27 as shown in FIGURE 1 and there connected through slip ring contacts 39 in a manner well known in the art. The slip ring contact is in turn connected over a wire or electrical cable 40 to the control unit 32.

The control unit 32 may be any device such as a solenoid valve for controlling the pressure of the hydraulic fluid from supply 30 in inverse relationship with the pressure developed in the combustion chamber 13 as measured by the electrical signal applied to control unit 32 from transducer 35 over wires 36, 37, 38 and 40.

Transducer 35 may, for example, be simply a potentiometer or voltage divider, the pick-off arm of which is moved by a diaphragm responsively to the pressure in the combustion chamber 13. The two ends of the potentiometer would of course be supplied with a voltage derived preferably from a battery or other source of voltage in control unit 32. The potentiometer is preferably arranged so that an increase in combustion chamber pressure will move the potentiometer arm so as to decrease the voltage appearing on the pick-off arm in order to establish an inverse relationship between combustion chamber pressure and the magnitude of the electrical signal. This signal from the potentiometer pick-off arm is then applied over the circuit discussed above to the control unit 32 to actuate a solenoid valve either directly if a fixed magnitude of thrust is desired, or after comparison with (by addition or subtraction) either a fixed or remotely controlled variable source of voltage which may act as a standard to set combustion chamber pressure. It will, of course, be apparent that many different types of control systems may be used, a number of which are well-known in the art and therefore need not be described in greater detail. In any of these systems, the control is essentially a servo mechanism which varies the pressure of the hydraulic fluid applied to the hydraulic motor 29 through line 33 as by varying the position of an electrically actuated valve in the control unit in such a manner that as the combustion chamber pressure and hence, the thrust of the rocket increases above a preselected desired value, the pressure of the hydraulic fluid will be reduced thereby reducing the speed of operation of the hydraulic motor 29 and consequently, reducing the rate at which the winch 27 winds up the cable 24. This, in turn, reduces the rate at which the combustion chamber is drawn into the fuel tank and hence, reduces the fuel extrusion rate thereby leading to the desired reduction in combustion chamber pressure. Of course, should combustion chamber pressure fall below the desired value, the above train of events are simply reversed, the increase in hydraulic fluid pressure leading to an increased rate of fuel extrusion and hence, bringing combustion chamber pressure back up to the desired value. As noted above, this preselected desired equilibrium value of combustion chamber pressure may either be fixed before ignition of the rocket or it may be variably remotely programmed by signals transmitted to the control unit 32.

Figure 2:
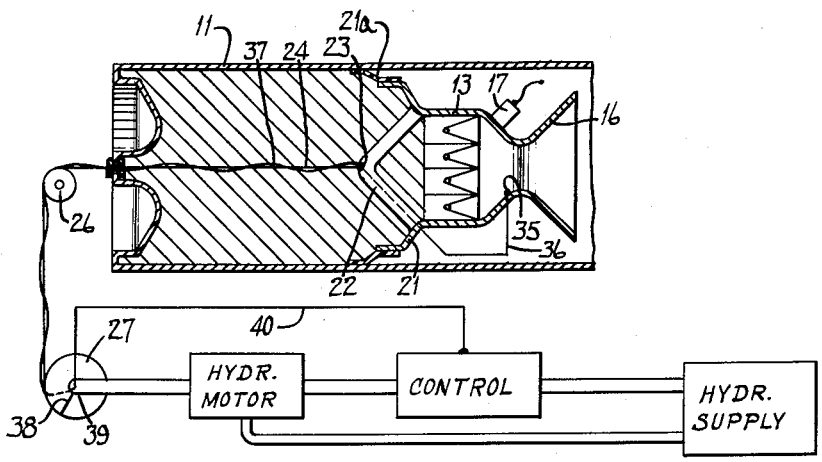
FIGURE 2 is a view similar to FIGURE 1 but showing the parts in a position occupied during the course of the operation of the engine.

In either event, the operation of the rocket will be more readily apparent from a comparison of FIGURES 1 and 2. Before the rocket is fired, the combustion chamber assembly occupies the position shown in FIGURE 1. Closing of switch 19 applies an electrical signal to the igniter 17 and may simultaneously apply an electrical signal over a wire 41 to the control unit 32 to initially open the valve controlling the flow of hydraulic fluid and thereby start the operation of motor 29. This in turn, ignites the fuel extruded into the combustion chamber as the hydraulic motor 29 actuates winch 27 thereby winding up the cable 24 and starting to draw the combustion chamber and nozzle assembly forwardly into the fuel tank 11. As the rearwardmost end 16a of the nozzle passes inside the rearwardmost end 11a of the fuel tank 11, the hot gases discharged from the nozzle impinge upon the side walls of the now empty rearward portion of the fuel tank. The fuel tank 11 is preferably composed of magnesium or aluminum but may also be of a plastic material or of any metal having a melting point such that the fuel tank walls will be decomposed or burned by the hot gases discharged from the nozzle, thereby eliminating the unnecessary weight of the unused portion of the fuel tank as the burning of the fuel in the tank progresses. The position of the combustion chamber and nozzle assembly in the fuel tank after slightly more than half of the fuel has been used, is illustrated in FIGURE 2. It will be noted that the portion 11a of the fuel tank has been burned away. Also, a portion of the line 20 leading to the igniter 17 is burned away as movement of the combustion chamber draws these leads into the path of the discharge gases.

It will also be noted, however, that at no time during the operation is any part of the control circuitry including transducer 35, electrical leads 36, 37, and 40 in the path of the hot discharge gases. This, of course, results from the fact that these components move as unitary parts of the slidable combustion chamber and nozzle assembly and the cable 24 by which this assembly is drawn into the fuel tank. The lead 37 is wound on the drum of the cable 38 along with the cable 24 which draws the combustion chamber into the fuel tank. Continuous signal may be taken from this lead through the slip rings 39 and lead 40 to be applied to the control unit 32 so as to control the rate at which the hydraulic motor and winch draw the combustion chamber into the fuel tank to thereby control the fuel extrusion rate and hence, burning rate and rocket thrust. It will, of course, be understood that since the rocket is intended to be disposable in order to achieve the advantage of reducing the fuel tank weight during the course of operation (and hence increasing the efficiency of operation during the course of the run) the starting circuitry including igniter lead 20 and control start lead 41 need not be preserved after their initial function has been performed. If, however, the rocket were intended for use in an application where it might be desirable to completely terminate the operation before all of the fuel has been used and then restart operation, these leads could, of course, also be disposed in a manner similar to that of the control lines 36 and 37 through the spider 22 and cable 24.

It will also be understood that various other and different cross-sectional shapes and designs of the nozzle and fuel tank may readily be used. For example, the discharge nozzle 16 could have a maximum outer diameter at its rearward end 16a which is equal to that of the diameter of the fuel tank 11 and the fuel tank could initially extend rearwardly to the end of the nozzle so that the combustion chamber and nozzle assembly are initially afforded a two point slidable mounting in the fuel tank, one point of contact being at the extreme rearward end 16a of the nozzle and another being at the lips 21a on flange members 21. It will, of course, be understood that the most appropriate design of the precise shape of the assembly will be determined by the necessary capacity and hence, the necessary size and weight of the rocket for any particular intended application.

While a particular exemplary preferred embodiment of the invention has been described in detail above, it will be understood that modifications and variations therein may be effected without departing from the true spirit and scope of the novel concepts of the present invention as defined by the following claims.

I claim as my invention:

1. A gelatinous mono-propellant fueled disposable rocket motor comprising, a fuel tank adapted to contain said fuel, a combustion chamber having a plurality of burner tubes therein, a nozzle attached to one end of said combustion chamber and positioned to receive the discharge exhaust gases generated from said gelatinous mono-propellant fuel consumed in said combustion chamber, said combustion chamber having its other end in communication with the interior of said fuel tank, means to slidably mount said combustion chamber in said fuel tank, means to move said combustion chamber and said nozzle into said fuel tank to force said fuel into said combustion chamber, and means to ignite said fuel in said combustion chamber, said fuel tank having a larger cross-sectional dimension than said combustion chamber or nozzle in order to accommodate said motion, said fuel tank consisting of material which will be decomposed by the exhaust gases from said nozzle.

2. A disposable rocket motor comprising, a fuel tank, a combustion chamber and nozzle assembly slidably mounted in said fuel tank and dimensioned to permit said assembly to be drawn into said fuel tank, one end of said combustion chamber being in communication with the interior of said fuel tank, means to move said assembly into said fuel tank to force fuel into said combustion chamber, and means to ignite said fuel in said combustion chamber to generate gases to be discharged from said nozzle, said fuel tank being composed of material which is decomposed by said exhaust gases from said nozzle when said nozzle is moved into said fuel tank.

3. A gelatin mono-propellant fuel disposable rocket motor comprising, a fuel tank adapted to contain said fuel, a combustion chamber and nozzle assembly slidably mounted in said fuel tank and dimensioned to permit said assembly to be drawn into said fuel tank, one end of said combustion chamber being in communication with the interior of said fuel tank, means comprising a cable extending axially of said fuel tank and connected to move said assembly into said fuel tank to force fuel into said combustion chamber, and means to ignite said fuel in said combustion chamber to generate gases to be discharged from said nozzle, said fuel tank being composed of material which is decomposed by said exhaust gases from said nozzle when said assembly is moved into said fuel tank.

4. A disposable rocket motor comprising, a fuel tank, a combustion chamber and nozzle assembly slidably mounted in said fuel tank and dimensioned to permit said assembly to be drawn into said fuel tank, one end of said combustion chamber being in communication with the interior of said fuel tank, a cable attached to said combustion chamber and extending axially of said fuel tank and through the front end thereof, means to apply force to said cable to move said combustion chamber and nozzle assembly into said fuel tank to force fuel into said combustion chamber, and means to ignite said fuel in said combustion chamber to generate gases to be discharged from said nozzle, said fuel tank being composed of material which is decomposed by said exhaust gases from said nozzle when said assembly is moved into said fuel tank.

5. A gelatin mono-propellant fueled disposable rocket motor comprising, a fuel tank adapted to contain said fuel, a combustion chamber and nozzle assembly slidably mounted in said fuel tank and dimensioned to permit said assembly to be drawn into said fuel tank, one end of said combustion chamber being in communication with the interior of said fuel tank, a winch, a cable attached to said combustion chamber assembly and extending axially of said fuel tank and through the front of said fuel tank and attached to said winch, hydraulic motor means connected to actuate said winch to move said combustion chamber and nozzle assembly into said fuel tank to force said fuel into said combustion chamber, and means to ignite said fuel in said combustion chamber to generate gases to be discharged from said nozle, said fuel tank being composed of material which is decomposed by said exhaust gases from said nozzle when said assembly is moved into said fuel tank.

6. A disposable rocket motor comprising, a fuel tank, a combustion chamber and nozzle assembly slidably mounted in said fuel tank and dimensioned to permit said assembly to be drawn into said fuel tank, one end of said combustion chamber being in communication with the interior of said fuel tank, transducer means connected to provide an output signal which is a measure of the pressure in said combustion chamber, means connected to be controlled responsively to said signal to move said assembly into said fuel tank to force fuel into said combustion chamber at a rate such as to maintain a predetermined pressure in said combustion chamber, and means to ignite said fuel in said combustion chamber to generate gases to be discharged from said nozzle, said fuel tank being composed of material which is decomposed by said exhaust gases from said nozzle when said assembly is moved into said fuel tank.

7. A gelatin mono-propellant fueled disposable rocket motor comprising, a generally cylindrical fuel tank adapted to contain said fuel, a combustion chamber and nozzle assembly slidably mounted in said fuel tank and dimensioned to permit said assembly to be drawn into said fuel tank, said fuel tank being open at one end to accommodate discharge of exhaust gases from said nozzle, one end of said combustion chamber being in communication with the interior of said fuel tank, a winch, a cable attached to said combustion chamber and extending axially of said fuel tank and through the front of said fuel tank and attached to said winch, hydraulic motor means connected to drive said winch and cable to move said combustion chamber and nozzle assembly into said fuel tank to force fuel into said combustion chamber, and means to ignite said fuel in said combustion chamber to generate gases to be discharged from said nozzle, said fuel tank being composed of material which is decomposed by said exhaust gases from said nozzle when said assembly is moved into said fuel tank.

8. A gelatin mono-propellant fueled disposable rocket motor comprising, a generally cylindrical fuel tank open at one end, a combustion chamber and nozzle assembly slidably mounted in said open end of said fuel tank and dimensioned to permit said assembly to be drawn into said fuel tank, one end of said combustion chamber being in communication with the interior of said fuel tank, hydraulically actuated means to move said assembly into said fuel tank to force fuel into said combustion chamber, means to supply hydraulic fluid under pressure to said moving means, means to ignite said fuel in said combustion chamber to generate gases to be discharged from said nozzle, and means connected to control the pressure of said hydraulic fluid supplied to said moving means responsively to the pressure of said gases in said combustion chamber to maintain a predetermined thrust, said fuel tank being composed of material which is decomposed by said exhaust gases from said nozzle when said assembly is moved into said fuel tank.

9. A disposable rocket motor comprising, a fuel tank, a combustion chamber and nozzle assembly slidably mounted in said fuel tank and dimensioned to permit said assembly and said nozzle thereof to be drawn into said fuel tank to force fuel into said combustion chamber, hydraulically actuated means to move said assembly with said nozzle into said fuel tank, and means to ignite said fuel in said combustion chamber to generate gases to be discharged from said nozzle, said fuel tank being composed of material which is decomposed by said exhaust gases from said nozzle when said nozzle is moved into said fuel tank.

10. A gelatin mono-propellant fueled disposable rocket motor comprising, a generally cylindrical fuel tank open at one end, a combustion chamber and nozzle assembly slidably mounted in said fuel tank and dimensioned to permit said assembly to be drawn into said fuel tank, one end of said combustion chamber being in communication with the interior of said fuel tank to receive fuel from said tank, a winch, a cable attached to said combustion chamber assembly and extending axially through said fuel tank and through the front of said fuel tank to said winch, hydraulic motor means connected to drive said winch, means to supply hydraulic fluid under pressure to said motor means, means to ignite said fuel in said combustion chamber to generate gases to be discharged from said nozzle, transducer means positioned to sense the pressure of said gases in said combustion chamber and to provide an electrical output signal having a characteristic which is a measure of said pressure, electrical conductor means carried by said cable and connected to said transducer means, means to control the pressure of the hydraulic fluid supplied to said motor, said control means being connected to said electrical conductor means to be responsive to said transducer output signal to control the pressure of said hydraulic fluid so as to drive said hydraulic motor and winch at a rate such as to maintain a predetermined pressure in said combustion chamber, said hydraulic motor and winch drawing said assembly with said nozzle thereof into said fuel tank and said fuel tank being composed of material which is decomposed by said exhaust gases from said nozzle when said nozzle is moved into said fuel tank.

References Cited in the file of this patent

UNITED STATES PATENTS

| | | |
|---|---|---|
| 2,114,214 | Damblanc | Apr. 12, 1938 |
| 2,700,337 | Cumming | Jan. 25, 1955 |
| 2,753,801 | Cumming | July 10, 1956 |
| 2,789,505 | Cumming et al. | Apr. 23, 1957 |

FOREIGN PATENTS

| | | |
|---|---|---|
| 582,621 | Great Britain | Nov. 22, 1946 |
| 695,048 | Great Britain | Aug. 5, 1953 |
| 701,117 | Great Britain | Dec. 16, 1953 |